(12) United States Patent
Cardwell, III et al.

(10) Patent No.: US 6,374,468 B1
(45) Date of Patent: Apr. 23, 2002

(54) HIGHLY COMPLIANT RETENTION MECHANISM FOR ATTACHING AND QUICKLY RELEASING COMPONENTS

(75) Inventors: Walter Wilcox Cardwell, III; Stephen Andrew Stickel; An Tran, all of Austin, TX (US)

(73) Assignee: Vermillion Corporation, Austin, TX (US)

( * ) Notice: Subject to any disclaimer, the term of this patent is extended or adjusted under 35 U.S.C. 154(b) by 0 days.

(21) Appl. No.: 09/602,902

(22) Filed: Jun. 23, 2000

(51) Int. Cl.7 .......................... A44B 13/02; A44B 17/00
(52) U.S. Cl. .................. 24/597; 24/265 H; 24/324; 24/662; 24/905
(58) Field of Search ................... 24/597, 265 H, 24/598.4, 905, 297, 662, 324, 3.6, 3.13

(56) References Cited

U.S. PATENT DOCUMENTS

| | | | | |
|---|---|---|---|---|
| 3,392,729 A | * | 7/1968 | Lenoir | 24/3.13 |
| 3,551,963 A | * | 1/1971 | Mosher, Jr. et al. | 24/662 |
| 4,304,403 A | * | 12/1981 | Wilson | 24/310 |
| 4,599,767 A | | 7/1986 | Kasai | |
| 4,742,605 A | | 5/1988 | Ritacco | |
| 5,146,657 A | * | 9/1992 | Frano | 24/265 H |
| 5,502,878 A | * | 4/1996 | Anscher | 24/265 H |
| 5,548,875 A | | 8/1996 | Hart et al. | |
| 5,566,428 A | | 10/1996 | Takahashi | |
| 5,769,681 A | | 6/1998 | Greenwood, Sr. et al. | |

FOREIGN PATENT DOCUMENTS

| | | | | |
|---|---|---|---|---|
| GB | 0951000 | * | 3/1964 | ................... 24/662 |
| IT | 0676355 | * | 11/1964 | ................... 24/297 |

\* cited by examiner

Primary Examiner—Victor Sakran
(74) Attorney, Agent, or Firm—Brian F. Russell; Bracewell & Patterson, L.L.P.

(57) ABSTRACT

A two-piece retention mechanism has a base and a snap ring that are individually mounted to two separate components that a user desires to releasably join. The snap ring has a round body with a hole for attaching the first component thereto. A conical element with a spherical tip protrudes from the snap ring body. The base has a cylindrical body for mounting to the second component. The body of the base has a cap with a rounded face and a conical opening that tapers down to a cylindrical hole. After the base and snap ring are mounted to their respective components, the snap ring may be removably connected to the base by inserting its spherical tip into the conical opening in the base. The complementary shapes of the snap ring and base allow for significant axial and angular misalignment. The snap ring and base elastically deform and emit an audible "snap" during this sequence. To disengage the snap ring from the base, the user simply pulls the snap ring away from base to overcome the retention forces.

20 Claims, 2 Drawing Sheets

HIGHLY COMPLIANT RETENTION MECHANISM FOR ATTACHING AND QUICKLY RELEASING COMPONENTS

BACKGROUND OF THE INVENTION

1. Technical Field

The present invention relates in general to an improved retention mechanism, and in particular to an improved mechanism for releasably joining components. Still more particularly, the present invention relates to a highly compliant retention mechanism for attaching and quickly releasing components.

2. Description of the Related Art

Retention devices or mechanism for releasably joining two or more components are common and quite varied in the prior art. For example, one type of swivel snap hook device typically comprises a hook member attached to a first object, and an eye member attached to a second object. The hook member is then rotatably connected to the eye member with a separate retaining member. This common design requires three or more parts that are required to interlock, thereby increasing the number of steps and the time required to assemble and disassemble the components. U.S. Pat. No. 4,599,767 simplifies this common design to only two components, but the hook and eye members are permanently joined to each other, and one of the members uses a clip for third component attachment.

An improved swivel snap hook device is described in U.S. Pat. No. 5,548,875. This device is designed to release upon the application of a selected force by breaking a shear pin to unlatch a safety snap. Although a reservoir in the safety snap contains replacement shear pins, reconstructing the device with each deployment is cumbersome. Finally, a safety release mechanism disclosed in U.S. Pat. No. 4,742,605, also describes a device that can be readily separated into two pieces. Unfortunately, this design requires numerous complicated interworking parts to achieve the same result. Thus, an improved retention mechanism for attaching, quickly releasing, and, optionally, reattaching components is desirable.

SUMMARY OF THE INVENTION

A two-piece retention mechanism has a base and a snap ring that are individually mounted to two separate components that a user desires to releasably join. The snap ring has a round body with a hole for attaching the first component thereto. A cone-like element with a spherical tip protrudes from the snap ring body. The base has a cylindrical body for mounting to the second component. The body of the base has a cap with a rounded face and a conical opening that tapers down to a cylindrical hole.

After the base and snap ring are mounted to their respective components, the snap ring may be removably connected to the base by inserting its spherical tip into the conical opening in the base. The complementary shapes of the snap ring and base allow for significant axial and angular misalignment. The snap ring and base elastically deform and emit an audible "snap" during this sequence. To disengage the snap ring from the base, the user simply pulls the snap ring away from base to overcome the retention forces.

Accordingly, it is an object of the present invention to provide an improved retention mechanism.

It is an additional object of the present invention to provide an improved mechanism for releasably joining components.

Still another object of the present invention is to provide a highly compliant retention mechanism for attaching and quickly releasing components.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF ILLUSTRATIVE EMBODIMENT

Figure 1:
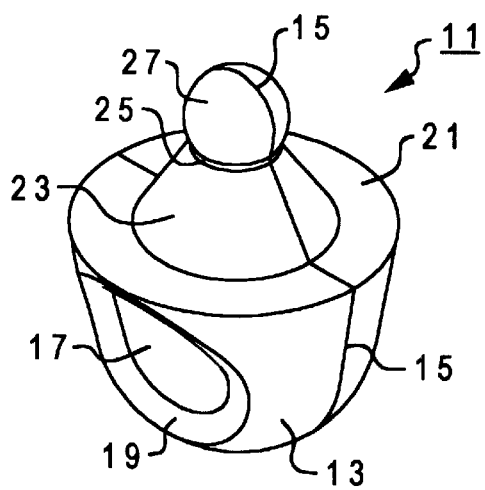
FIG. 1 is a top isometric view of a snap ring constructed in accordance with the invention.
Figure 2:
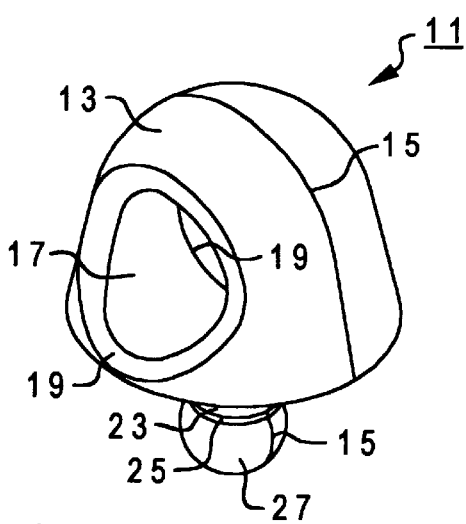
FIG. 2 is a bottom isometric view of the snap ring of FIG. 1.

Referring to FIGS. 1 and 2, a snap ring 11 constructed in accordance with the invention is shown. Snap ring 11 has a generally semi-spherical lower body 13 that is bisected by a small ridge 15. Ridge 15 is provided for manufacturing purposes and extends completely around the exterior of snap ring 11. Snap ring 11 is symmetrical about ridge 15 and about a plane (not shown) that perpendicularly bisects ridge 15 and snap ring 11. Lower body 13 has a large body attachment feature comprising, in the embodiment shown, an opening or hole 17 that extends completely through lower body 13 from one side to an opposite side. Lower body 13 also has an annular concave taper 19 on each of its sides that is provided between the exterior of lower body 13 and hole 17. Tapers 19 are beveled to facilitate entry into hole 17 by an object being attached to snap ring 11 (e.g., a key ring, etc.).

In this embodiment, lower body 13 terminates with a flat upper surface 21 having a circular perimeter. A generally cone-like or frustoconical element 23 centrally protrudes from the flat upper surface 21 of lower body 13 such that the axis (not shown) of frustoconical element 23 is substantially perpendicular to surface 21. Frustoconical element 23 tapers down to a slender, annular neck 25 having a minor diameter from which a spherical tip 27 extends at the distal end thereof. Spherical tip 27 has a diameter that is larger than the minor diameter of annular neck 25, but smaller than the major diameter of frustoconical element 23 where it intersects surface 21. However, the major diameter of frustoconical element 23 need not be larger than the diameter of spherical tip 27. In the preferred embodiment, all of the components of snap ring 11 are formed as a single, integrated unit from a rigid yet somewhat elastic material such as plastic.

Figure 3:
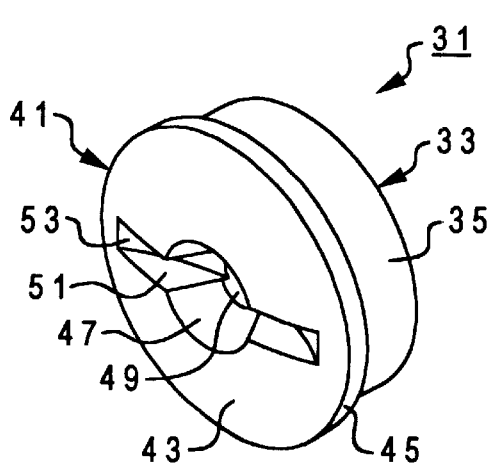
FIG. 3 is a top isometric view of a base constructed in accordance with the invention for use in conjunction with the snap ring of FIG. 1.
Figure 4:
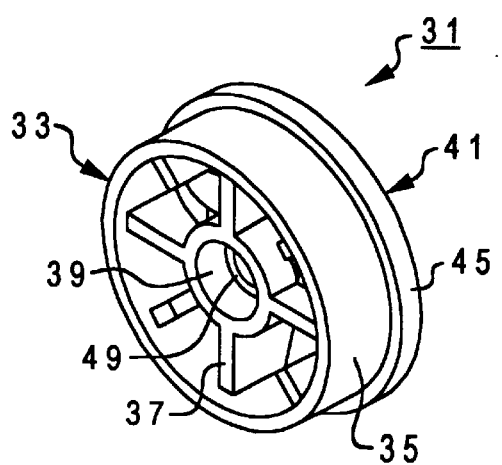
FIG. 4 is a bottom isometric view of the base of FIG. 3.
Figure 5:
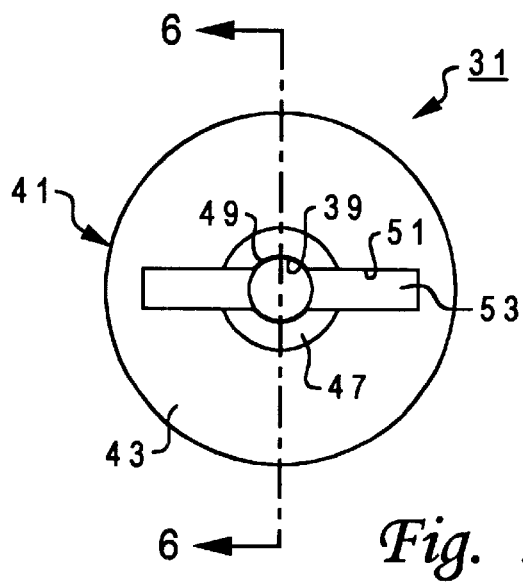
FIG. 5 is a top plan view of the base of FIG. 3.

Referring now to FIGS. 3–5, a base 31 constructed in accordance with the invention is shown. Base 31 has a hollow, cylindrical lower body 33 having an exterior surface 35 that may be provided with common attachment means such as smooth, ribbed, or threaded surfaces for attaching the base 31 to another object (e.g., a dispenser, telephone, or other portable electronic device or tool, etc.). Alternatively, base 31 may be integrally formed with the other object. The interior of lower body 33 is reinforced with a rib-like structure 37 (FIG. 4) for structural strength. A small, shallow, cylindrical hole 39 is defined at the center of the rib-like structure 37 such that the axes (not shown) of hole 39 and cylindrical lower body 33 are coincident.

A cylindrical, disk-like cap 41 is mounted to the upper end of lower body 33. Ideally, base 31 and all of its components, including lower body 33 and cap 41, are integrally formed as a single unit from a rigid yet somewhat elastic material such as plastic. Cap 41 has a slightly convex face 43 (FIG. 3) and a circular outer edge 45. The diameter of outer edge 45 is slightly greater than a diameter of cylindrical lower body 33 such that outer edge 45 appears as a flange for base 31. Like lower body 33, cap 41 has a central opening 47 that is coincident with hole 39 (FIGS. 3–5). Preferably, opening 47 is a concave, cone-shaped recess that tapers toward the small hole 39. A narrow throat 49 is located between opening 47 and hole 39 for interfacing their differing diameters. Throat 49 has a diameter that is slightly larger than a diameter of neck 25 on snap ring 11. Cap 41 is also provided with an elongated, generally rectangular drive slot 61 that straddles and bisects opening 47. In the event that surface 35 of lower body 33 is threaded, slot 51 is provided to facilitate rotation of base 31 with a screwdriver or the like relative to the object to which it is attached. In the embodiment shown, slot 51 has an inverted, arcuate lower surface 53 that accepts the round edge of a coin in order to rotate base 31.

Figure 6:
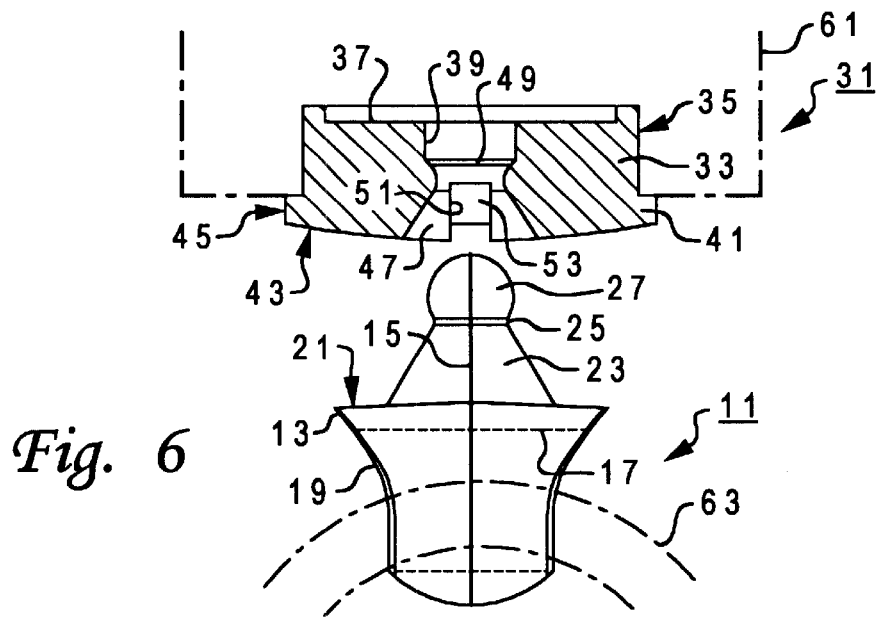
FIG. 6 is side elevational view of the base of FIG. 3 sectioned along the line 5—5 of FIG. 5, and the snap ring of FIG. 1 in profile prior to insertion into the base.

Referring now to FIG. 6, in operation base 31 is mounted to or integrally formed with a first object 61 (shown in phantom). As stated previously, there are a number of common ways base 31 can be attached to object 61. If the exterior surface 35 of base 31 is smooth or ribbed, base 31 is simply inserted into object 61 and retained by interference or frictional forces. For additional retention force, base 31 may be bonded to object 61. If surface 35 and object 61 are threaded, a screwdriver or coin may be inserted into slot 51 and twisted in order to apply torque to base 31 for installation in object 61. Snap ring 11 is mounted to a second object 63 (also shown in phantom) such as a key ring or lanyard in a conventional manner.

Figure 7:
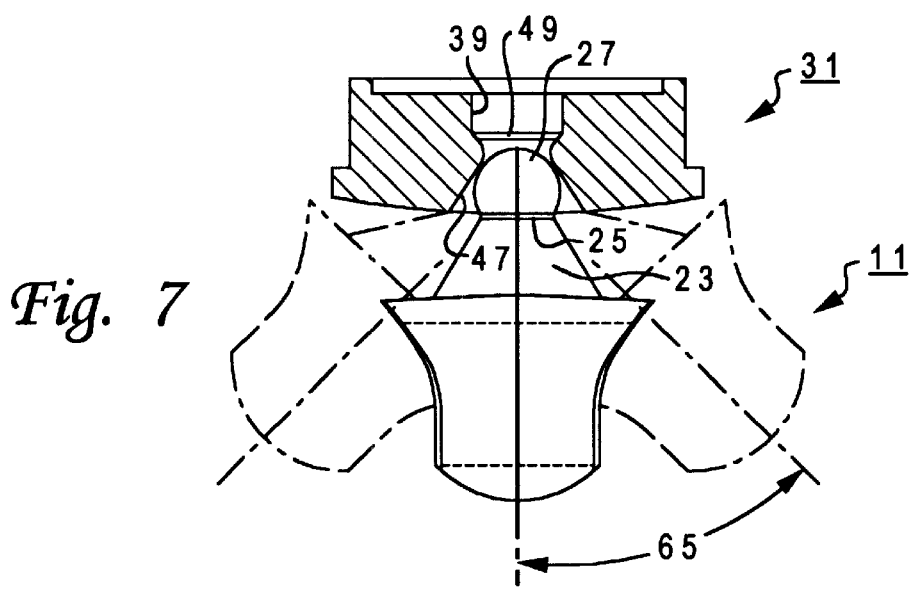
FIG. 7 is side elevational view of the base and snap ring of FIG. 6 at a first point of insertion contact, and illustrates a range of permissible insertion angles in phantom.

As shown in FIG. 7, snap ring 11 may be removably connected to base 31 by first locating the spherical tip 27 of snap ring 11 generally near and/or inside the conical opening 47 in base 31. As shown by the phantomed shapes to the left and right of snap ring 31, the complementary shapes of snap ring 11 and base 31 allow for a significant degree of axial misregistration and angular misalignment therebetween prior to engagement between the components. In the embodiment shown, the axis of snap ring 11 may be misaligned up to an angle 65 (approximately 45 degrees) from the axis of base 31 in any radial direction relative to the axis of base 31. Such compliance is made possible by the major diameter at the mouth of opening 47 (which is larger than the diameter of tip 27), its conically tapered sidewalls, and the spherical exterior of tip 27. Other alternatives, such as cylindrical walls or elements may be used to decrease compliance.

Figure 8:
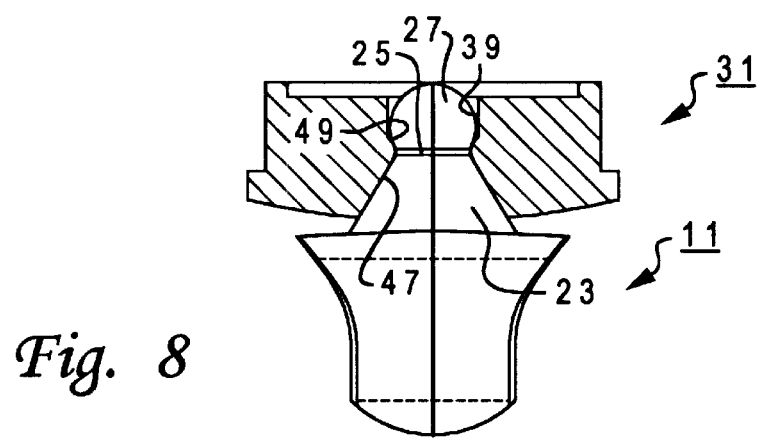
FIG. 8 is side elevational view of the base and snap ring of FIG. 6 after the snap ring is fully inserted into the base.

As tip 27 of snap ring 11 continues to enter opening 47 of base 31, their conical surfaces engage each other to force compliance and eventually axial and angular alignment between the components. In FIG. 7, note that the diameter of tip 27 is larger than the innermost or minor diameters of opening 47 and throat 49. As a result, temporary, elastic deformation is required to join the elements together. As tip 27 passes through opening 47 to throat 49 (FIG. 8), slight elastic deformation of at least one of and, preferably, both tip 27 and base 31 occurs to complete the union. An audible "snap" is typically perceived by the user during this sequence. When snap ring 11 and base 31 are fully engaged, tip 27 is located in hole 39 such that neither body 11 nor any portion of base 31 are deformed, and neck 25 on snap ring 11 substantially registers with throat 49 in base 31. In this fully engaged position, the lack of elastic deformation of the components eliminates creep in addition, the conical surfaces of frustoconical element 23 and opening 47 abut one another to achieve a snug fit with no stress or deformation. However, in the engaged position (FIG. 8), snap ring 11 is capable of rotating relative to base 31.

To disengage snap ring 11 from base 31, the user simply exerts an axial force on snap ring 11 that is directed away from base 31. When the axial force exceeds the frictional and deformation forces between snap ring 11 and base 31, the components once again elastically deform and emit an audible "snap" as they disengage.

The invention has several advantages. The complementary shapes of the snap ring and the base allow for a significant degree of axial misregistration and angular misalignment prior to engagement. This high degree of compliance is made possible by the large diameter at the mouth of the conical opening in the base, and the spherical and conical exteriors of the snap ring. In addition, the tapers to the through-hole in the snap ring are beveled to facilitate entry into the hole. Individually, the snap ring and the base are formed as single, integrated units that allow limited elastic deformation and unlimited rotational movement therebetween.

The exterior of the base may be provided with a variety of attachment surfaces depending on the application, and the slot in the cap of the base permits the base to be easily mounted. The snap ring is adequately retained on the base via frictional and interference forces. The "break away" force required to remove the snap ring from the base may be calibrated for different applications by selecting appropriate materials and dimensions. Finally, an audible, confirmation "snap" is typically perceived by the user during engagement and disengagement of the components.

While the invention has been shown or described in only some of its forms, it should be apparent to those skilled in the art that it is not so limited, but is susceptible to various changes without departing from the scope of the invention.

What is claimed is:

1. A retention mechanism, comprising:
   a body having a body attachment feature that is adapted to secure a first component to the body, a protrusion extending from the body, and a tip on a distal end of the protrusion;

a base having a base attachment feature that is adapted to secure a second component to the base, and an opening for receiving the tip on the protrusion of the body; wherein the retention mechanism has a released position wherein the body is separated from the base, a transition phase wherein the tip is inserted into the opening in the base such that at least one of the base and the tip is temporarily and elastically deformed, and an engaged position wherein the body joins the first component to the second component via the base while the body and the base are free of elastic deformation; and further comprising:

a neck on the body located between the protrusion and the tip;

a throat in the opening in the base; and wherein when the body is joined to the base, the neck and the throat substantially register such that the tip of the body is located beyond the opening and the throat in the base.

2. The retention mechanism of claim 1 wherein the protrusion of the body has a cone-like shape.

3. The retention mechanism of claim 1 wherein the tip on the protrusion of the body is spherical.

4. The retention mechanism of claim 1 wherein the hole in the base has a cone-like shape.

5. The retention mechanism of claim 1 wherein the protrusion of the body has a dimension that is less than a largest dimension of the tip.

6. The retention mechanism of claim 1 wherein the opening in the base has a first dimension that is greater than a largest dimension of the tip of the body, and a second dimension that is less than the largest dimension of the tip of the body.

7. The retention mechanism of claim 1 wherein the body attachment feature is a hole in the body.

8. The retention mechanism of claim 1 wherein the retention mechanism has a released position wherein the body is separated from the base, a transition phase wherein the tip is inserted into the opening in the base such that at least one of the base and the tip is temporarily and elastically deformed, and an engaged position wherein the body joins the first component to the second component via the base while the body and the base are free of elastic deformation.

9. The retention mechanism of claim 1 wherein the protrusion of the body has a radial dimension that is greater than a largest radial dimension of the tip.

10. A retention mechanism, comprising:

a body having a body attachment feature that is adapted to secure a first component to the body, an element having a generally cone-like shape extending from the body, and a tip having a generally spherical shape on a distal end of the element;

a base having a base attachment feature that is adapted to secure a second component to the base, and an opening having a generally cone-like shape for receiving the tip and the element of the body; wherein the body is adapted to releasably join the first component to the second component via the base by inserting the tip of the body into the opening in the base such that a highly compliant fit is achieved therebetween; and further comprising:

a neck on the body located between the element and the tip;

a throat in the opening in the base; and wherein when the body is joined to the base, the neck and the throat substantially register such that the tip of the body is located beyond the opening and the throat in the base.

11. The retention mechanism of claim 10 wherein the body attachment feature is a hole in the body.

12. The retention mechanism of claim 10 wherein the element of the body has a minor diameter that is less than the diameter of the tip.

13. The retention mechanism of claim 10 wherein the body and the base each have an axis and are capable of accommodating angular misalignment between their respective axes of up to approximately 45 degrees in any radial direction relative to the axis of the base.

14. The retention mechanism of claim 10 wherein the opening in the base has a major diameter that is greater than a diameter of the spherical tip of the body, and a minor diameter that is less than the diameter of the spherical tip of the body.

15. The retention mechanism of claim 10 wherein the body and the base each have an axis and are capable of accommodating angular misalignment between their respective axes of up to approximately 45 degrees in any radial direction relative to the axis of the base.

16. The retention mechanism of claim 10 wherein the element of the body has a diameter that is greater than a largest diameter of the tip.

17. A retention mechanism comprising:

a body having a body attachment feature that is adapted to secure a first component to the body, an element having a generally cone-like shape extending from the body, and a tip having a generally spherical shape on a distal end of the element, wherein the element has a minor diameter that is less than a diameter of the tip;

a base having a base attachment feature that is adapted to secure a second component to the base, and an opening having a generally cone-like shape for receiving the tip and the element of the body; wherein the retention mechanism has a released position wherein the body is separated from the base, a transition phase wherein the tip is inserted into the opening in the base such that at least one of the base and the tip is temporarily and elastically deformed, and an engaged position wherein the body joins the first component to the second component via the base while the body and the base are free of elastic deformation to avoid creep; and further comprising:

a neck on the body located between the element and the tip and defined at the minor diameter of the element;

a throat in the opening in the base defined at a minor diameter of the opening; and wherein when the body is joined to the base, the neck and the throat substantially register such that the tip is located beyond the opening and the throat.

18. The retention mechanism of claim 17 wherein the opening in the base has a major diameter that is greater than the diameter of the tip, and a minor diameter that is less than the diameter of the tip.

19. The retention mechanism of claim 17 wherein the base has a drive slot for applying torque to the base.

20. The retention mechanism of claim 17 wherein the element of the body has a major diameter that is greater than a largest diameter of the tip.

* * * * *